Patented June 4, 1946

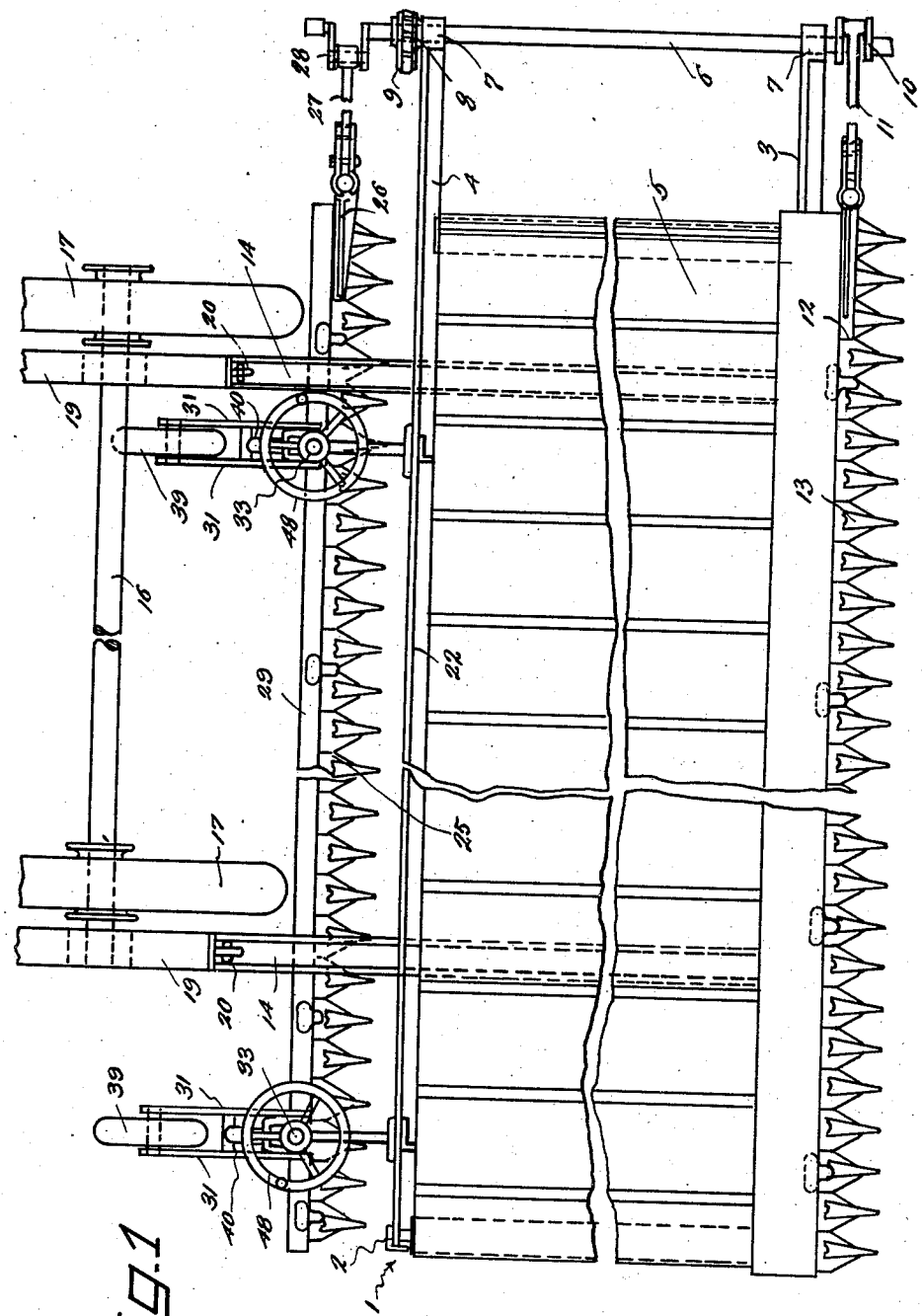

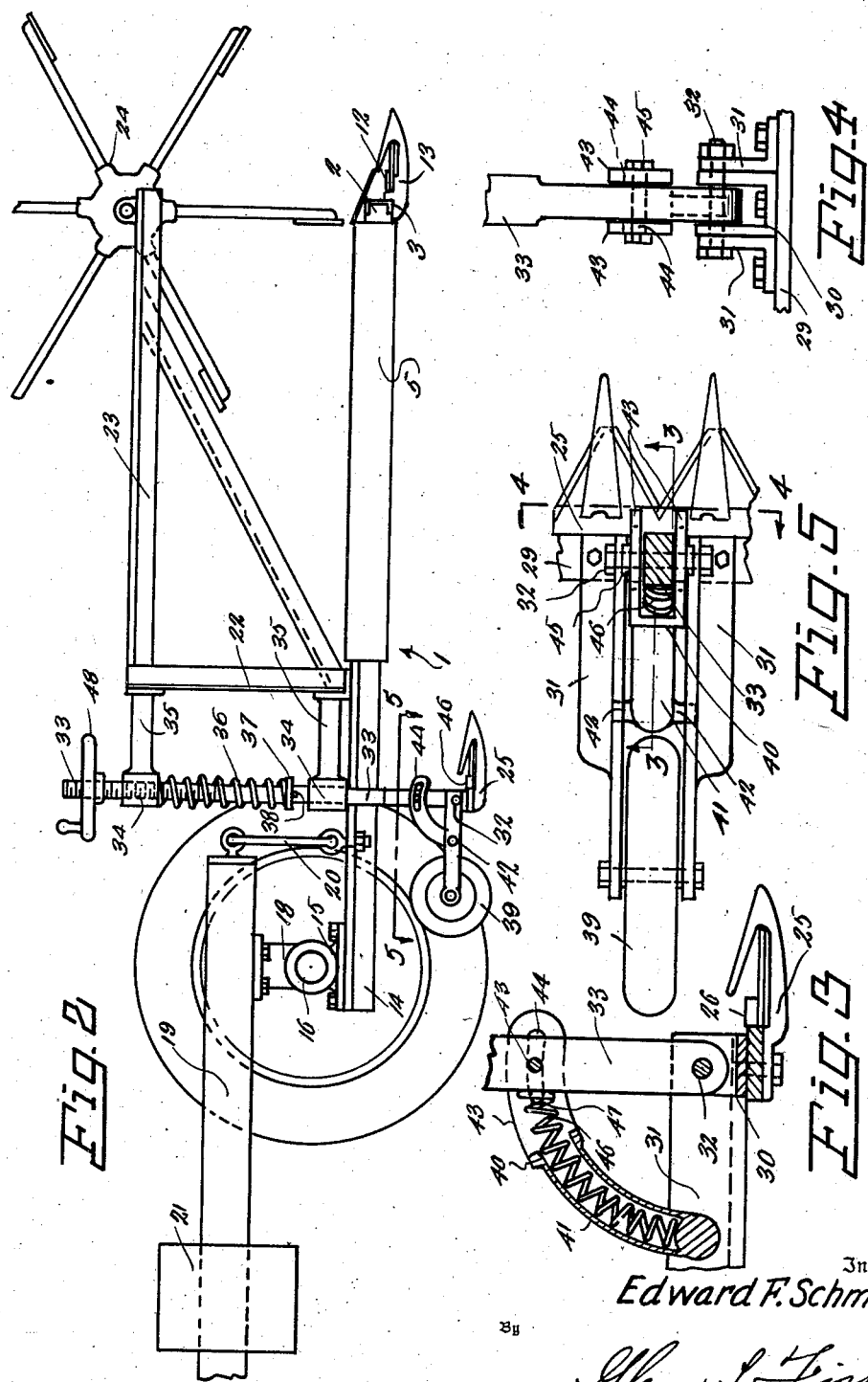

2,401,513

UNITED STATES PATENT OFFICE 2,401,513

HARVESTER

Edward F. Schmidt, Spokane, Wash.

Application February 24, 1945, Serial No. 579,601

7 Claims. (Cl. 56—238)

This invention relates to harvesters of the type used for topping or heading grain. After the heads have been cut from grain the standing stubble or straw, which is quite tall, is disced into the ground and then plowed under, but since a large part of the stubble is missed while discing, it interferes with plowing.

Therefore, one object of the invention is to provide a harvester having a supplemental cutting means so mounted that after the heads have been cut from the growing grain, the stubble or straw may be cut close to the ground so that it will fall flat upon the ground and may be readily plowed under or raked into piles for burning.

Another object of the invention is to provide supplemental cutting means which is mounted adjacent the rear end of the platform carrying the main cutting means where it is supported in such manner that it will be maintained in predetermined spaced relation to the ground and cut the stubble close to the ground.

Another object of the invention is to provide auxiliary cutting means carried by shafts which are disposed vertically and slidable through bearings carried by a barrier extending across the platform along the rear edge of the apron or conveyor which carries the grain away after it has been cut from the stubble.

Another object is to provide an auxiliary cutting means having rearwardly extending brackets which are pivoted at their front ends to the vertical shafts and carry wheels at their rear ends, means being provided for yieldably resisting upward tilting of the brackets and thus allowing the cutting means to be held substantially parallel to the surface of the ground over which the harvester is moving.

Another object of the invention is to provide means for urging the shafts downwardly through bearings in which they are slidably received, there being also provided means for shifting the shafts upwardly and holding them in elevated position with the auxiliary cutter and its wheels out of contact with the ground while transporting the harvester from place to place.

Another object of the invention is to provide a device of this character which is simple in construction, efficient in operation, and not liable to get out of order when in use.

In the accompanying drawings:

Fig. 1 is a top plan view showing a cutting mechanism of a harvester equipped with the improved auxiliary cutting means.

Fig. 2 is a side view of the structure shown in Fig. 1.

Fig. 3 is a fragmentary sectional view on the line 3—3 of Fig. 5.

Fig. 4 is a fragmentary sectional view on the line 4—4 of Fig. 5.

Fig. 5 is a fragmentary sectional view on the line 5—5 of Fig. 2.

The platform, which is indicated in general by the numeral 1, is of the usual construction found in harvesters known as "combines" and has a frame 2 including front and rear bars 3 and 4 between which is mounted an apron or endless conveyor 5. A shaft 6 is rotatably mounted through bearings 7 at the ends of bars 3 and 4 and carries a sprocket 8 so that rotary motion may be transmitted to this shaft by a chain 9. At its front end, the shaft 6 carries a crank 10 with which is engaged a pitman 11 for transmitting reciprocating movement to the cutter bar 12 of the main cutting means 13 extending along the front edge of the platform 1. This main cutting means is at such height that it will cut the heads from growing grain and leave the stubble or straw standing in a field. Bars 14 extend rearwardly from the platform 1 and, at their rear ends carry bearings 15 which fit about the shaft or axle 16 carrying wheels 17. The axle is also engaged by bearings 18 depending from bars 19 which extend across the axle longitudinally of the bars 14 and have their front ends connected with the bars 14 by links 20. Each bar 19 carries a weight 21 which is shiftable along the same and when the weights are properly adjusted they will maintain the bars 19 and the platform in the substantially horizontal position shown in Fig. 2. There has also been provided a barrier 22 which extends along the platform 1 adjacent the rear edge of the conveyor 5 and this barrier carries supports 23 between which a reel 24 of conventional construction is rotatably mounted and operated by conventional means for pushing growing grain into contact with the main cutting means.

After the heads have been cut from the growing grain by the main cutting means 13, the stubble or straw is to be cut so that it will lie flat on the ground and may be readily plowed under or gathered for burning. To do this, there has been provided auxiliary cutting means 25. The auxiliary cutting means is similar in construction to the main cutting means and includes a cutter bar 26 engaged by a pitman 27 which is pivoted to a crank 28 carried by the shaft 6 and located rearwardly of the table. The bar 29 of the auxiliary cutting means carries U-shaped brackets 30 which project upwardly therefrom and are braced by the forward end portions of arms 31, as shown in Fig. 4, and, referring to this figure, it will be seen that the companion brackets 30 and arms 31 carry a pin or bolt 32 with which the flattened lower end portion of a shaft 33 is pivotally engaged. There are two of the shafts 33 which are spaced from each other longitudinally of the bar 29 and extend upwardly therefrom and slidably pass through sleeves 34 at rear ends of the upper and lower bearing brackets 35 carried by the barrier 22 at upper and lower edges thereof. Springs 36, which are coiled about the shaft 33 and have their lower ends engaged with washers 37 resting upon pins 38 passing through the shafts, urge the shafts downwardly so that the wheels 39 rotatably mounted between rear ends of the arms 31 will be held in contact with the ground as the harvester is moved across a field. Since the arms 31 are pivoted to lower ends of the shafts 33, the auxiliary cutter may tilt and maintain itself substantially parallel to the ground as the wheels 39 move therealong. This tilting movement of the auxiliary cutting means should be controlled and in order to do so there has been provided clevices 40. Each clevice has a hollow stem 41 pivotally mounted between the companion arms 31 by trunnions 42 which project from opposite sides of its lower end and engage through openings in the arms 31, as shown in Fig. 5. The forks 43 of the clevices straddle the shafts 33 and are formed with longitudinally extending slots 44 through which pass pins or bolts 45 carried by the shafts. These pins 45 guide and limit tilting of the auxiliary cutting means and, by referring to Fig. 3, it will be seen that each clevice has in its hollow stem a spring 46 which protrudes therefrom and has its upper end bearing against the shaft 33 about a stud 47 serving to prevent the spring from slipping out of abutting engagement with the shaft. The springs of the clevices urge the arms 31 downwardly and yieldably hold the wheels 39 in engagement with the ground. This arrangement of parts causes the wheels 39 to accurately follow the surface of the ground over which they pass and causes the auxiliary cutting means to cut the stubble or straw close to the ground.

When the harvester is being transported from one place to another and it is desired to prevent the auxiliary cutting means from making contact with obstructions or uneven places in a road or field over which the harvester is moving, the shafts are shifted upwardly through the medium of hand wheels 48. These hand wheels are threaded upon the upper portions of the shafts and when they are turned in a lowering direction they engage the sleeves of the upper bearing brackets 35 and continued turning will then cause the shafts 33 to be shifted upwardly until such movement is stopped by contact of the clevices 40 with the lower ends of the sleeves of the lower bearing brackets. The auxiliary cutting means will thus be held in an elevated position until a field of grain is to be cut and the hand wheels are turned in a direction to permit the springs 36 to shift the shafts 33 downwardly to the position shown in Fig. 2.

What is claimed is:

1. In a harvester, a platform pivotally mounted at its rear for vertical tilting and having cutting means along its front edge, an upright barrier carried by said platform, sets of upper and lower brackets carried by said barrier and provided with bearings disposed forwardly of the pivotal mounting for the platform, shafts shiftable vertically through the bearings of said brackets, springs urging said shafts downwardly, cutting means mounted between lower ends of said shafts for cutting straw after grain has been cut therefrom by the first mentioned cutting means, bars pivoted to said shafts and extending rearwardly therefrom, wheels carried by said bars and disposed forwardly of the pivotal mounting for said platform, and means for limiting tilting of the bars relative to said shafts.

2. In a harvester, a platform pivotally mounted at its rear for vertical tilting and having cutting means along its front edge, an upright barrier carried by said platform, sets of upper and lower brackets carried by said barrier and provided with bearings disposed forwardly of the pivotal mounting for the platform, shafts shiftable vertically through the bearings of said brackets, springs urging said shafts downwardly, a bar extending between said shafts, cutting means carried by said bar and located below the horizontal plane of the platform and the first cutting means, arms carried by said bar and extending rearwardly therefrom, said arms being pivoted to lower ends of said shafts, wheels carried by said arms and disposed forwardly of the pivotal mounting for said platform, and means for limiting tilting of said arms relative to said shafts.

3. In a harvester, a platform pivotally mounted at its rear for vertical tilting and having cutting means along its front edge, an upright barrier carried by said platform, sets of upper and lower brackets carried by said barrier and provided with bearings disposed forwardly of the pivotal mounting for the platform, shafts shiftable vertically through the bearings of said brackets, springs urging said shafts downwardly, a bar extending between said shafts, cutting means carried by said bar and located below the horizontal plane of the platform and the first cutting means, arms carried by said bar and extending rearwardly therefrom, said arms being pivoted to lower ends of said shafts and yieldably held against upward tilting movement, wheels carried by rear ends of said arms, and means for shifting said shafts upwardly to elevated position.

4. In a harvester, a platform pivotally mounted at its rear for vertical tilting and having cutting means along its front edge, an upright barrier carried by said platform, sets of upper and lower brackets carried by said barrier and provided with bearings disposed forwardly of the pivotal mounting for the platform, shafts shiftable vertically through the bearings of said brackets, springs urging said shafts downwardly, a bar extending between said shafts, cutting means carried by said bar and located below the horizontal plane of the platform and the first cutting means, arms carried by said bar and extending rearwardly therefrom, said arms being pivoted to lower ends of said shafts, wheels carried by said arms and disposed forwardly of the pivotal mounting for said platform, clevices having stems pivoted to said arms and provided with forks straddling said shafts and formed with longitudinally extending slots, springs carried by said stems and engaging said shafts to yieldably resist upward tilting of said arms, and pins carried by said bars and engaged in the slots of said forks to limit tilting of the arms.

5. In a harvester, a platform pivotally mounted at its rear for vertical tilting and having cutting means along its front edge, an upright barrier carried by said platform, sets of upper and lower brackets carried by said barrier and provided with bearings disposed forwardly of the pivotal mounting for the platform, shafts shiftable vertically through the bearings of said brackets, springs urging said shafts downwardly, a bar extending between said shafts, cutting means carried by said bar and located below the horizontal plane of the platform and the first cutting means, arms carried by said bar and extending rearwardly therefrom, said arms being pivoted to lower ends of said shafts and yieldably held against upward tilting movement, wheels carried by rear ends of said arms, and hand wheels threaded upon upper ends of said shafts for engaging the upper bearing arms and drawing the shafts upwardly to hold the cutting means carried thereby in an elevated position.

6. In a harvester, a platform pivotally mounted at its rear for vertical tilting and having cutting means along its front edge, shafts disposed vertically adjacent the rear end of said platform and forwardly of the pivotal mounting for the platform, said shafts being slidable vertically and urged downwardly, brackets pivoted to lower ends of said shafts and extending rearwardly therefrom, cutting means extending between and carried by said brackets and projecting forwardly from the shafts, wheels carried by rear ends of said brackets, means yieldably resisting upward tilting of said brackets, and means for shifting said shafts upwardly and holding same in elevated position.

7. In a harvester, a platform pivotally mounted at its rear for vertical tilting and having cutting means along its front edge, shafts disposed vertically adjacent the rear end of said platform and forwardly of the pivotal mounting for the platform, said shafts being slidable vertically and urged downwardly, cutting means extending between and connected with lower ends of said shafts, wheels associated with the last mentioned cutting means for engaging the ground and holding said last mentioned cutting means in predetermined spaced relation to the ground, and means for shifting said shafts upwardly and holding the shafts in elevated position.

EDWARD F. SCHMIDT.